United States Patent

Ladzinski et al.

[11] Patent Number: 5,993,065
[45] Date of Patent: Nov. 30, 1999

[54] UNIVERSAL SLIDER BUSHING

[75] Inventors: Kenneth J. Ladzinski, Almont; Timothy Marion, Rochester Hills; Dennis L. Peters, Dearborn Heights; Jack H. Atabak, Clarkston, all of Mich.

[73] Assignee: Chrysler Corporation, Auburn Hill, Mich.

[21] Appl. No.: 09/114,308

[22] Filed: Jul. 13, 1998

[51] Int. Cl.[6] ............................ F16C 29/04; F16C 33/74; F16C 23/04
[52] U.S. Cl. ............................ 384/49; 384/145; 384/206
[58] Field of Search .................... 384/38, 47, 57, 384/495, 498, 145, 146, 147, 192, 206, 130, 140, 151, 153; 280/124.127, 124.135, 124.136, 124.145; 277/634, 635, 636

[56] References Cited

U.S. PATENT DOCUMENTS

| | | |
|---|---|---|
| 1,118,761 | 11/1914 | Griffith . |
| 1,356,984 | 10/1920 | Howell . |
| 2,304,291 | 12/1942 | Wahlbergl . |
| 2,992,013 | 7/1961 | Zeigler et al. . |
| 3,024,039 | 3/1962 | Zeigler et al. . |
| 3,240,509 | 3/1966 | Pierce . |
| 3,578,354 | 5/1971 | Schott . |
| 3,604,725 | 9/1971 | Goff et al. . |
| 4,455,038 | 6/1984 | Capler, Jr. et al. . |
| 4,798,396 | 1/1989 | Minakawa . |
| 5,230,567 | 7/1993 | Takeuchi ................................. 384/43 |
| 5,242,228 | 9/1993 | Hattori .................................. 384/145 |
| 5,342,128 | 8/1994 | Gruber .............................. 384/206 X |
| 5,348,337 | 9/1994 | Ando . |
| 5,364,191 | 11/1994 | Gruber .............................. 384/206 X |
| 5,468,074 | 11/1995 | Godec et al. ......................... 384/495 |
| 5,666,861 | 9/1997 | Fee et al. .............................. 384/38 X |
| 5,685,556 | 11/1997 | Shibue et al. . |
| 5,692,767 | 12/1997 | Kato . |

*Primary Examiner*—Tamara L. Graysay
*Assistant Examiner*—Brandon C. Stallman
*Attorney, Agent, or Firm*—Lawrence Shurupoff

[57] ABSTRACT

A universal slider bushing includes an inner body within an outer body. The inner body has a convex spherical segment. The outer body has a concave spherical segment or socket supporting the convex spherical segment for universal movement. The inner body has a central through-passage. A ball bearing supports a shaft in the passage for longitudinal sliding movement and for rotation about its longitudinal axis.

2 Claims, 2 Drawing Sheets

UNIVERSAL SLIDER BUSHING

FIELD OF THE INVENTION

This invention relates generally to bushings and more particularly to a universal slider bushing.

BACKGROUND OF THE INVENTION

Bushings for supporting a shaft have wide application and may be used for example in the suspension of an automotive vehicle. What is needed is a bushing which will support a shaft for rotation, longitudinal sliding movement and universal pivotal movement.

SUMMARY OF THE INVENTION

In accordance with the present invention, a universal slider bushing is provided having an inner body disposed within a cage or outer body. The inner body has a convex spherical segment received in a concave spherical segment or socket of the outer body, thus supporting the inner body for universal movement. The inner body also has an elongated central through-passage in which an elongated shaft is received. A ball bearing in the passage supports the shaft for both longitudinal sliding movement and rotation about its own axis.

Preferably the outer body includes a ring-shaped metal shell, and the concave spherical segment or socket of the outer body is made of plastic and is secured to the inner cylindrical surface of the shell. The inner body is of elongated tubular form with ends that extend beyond the ends of the shell of the outer body. Boots are provided to seal between the ends of the inner body and the ends of the outer body.

In a preferred form of the invention, the shell has an integral annular flange at one end which is of smaller diameter than the convex spherical segment of the inner body. The shell also has an inner diameter at the opposite end which is greater than the convex spherical segment, with a removable annular flange at the opposite end which is of lesser diameter than the convex spherical segment. The convex spherical segment of the inner body is captured between these two flanges.

One object of this invention is to provide a universal slider bushing having the foregoing features and capabilities.

Another object of the invention is to provide a universal slider bushing which is composed of a relatively few simple parts, is rugged and durable in use, and is capable of being inexpensively manufactured and assembled.

DETAILED DESCRIPTION OF THE PREFERRED EMBODIMENT

Figure 1:
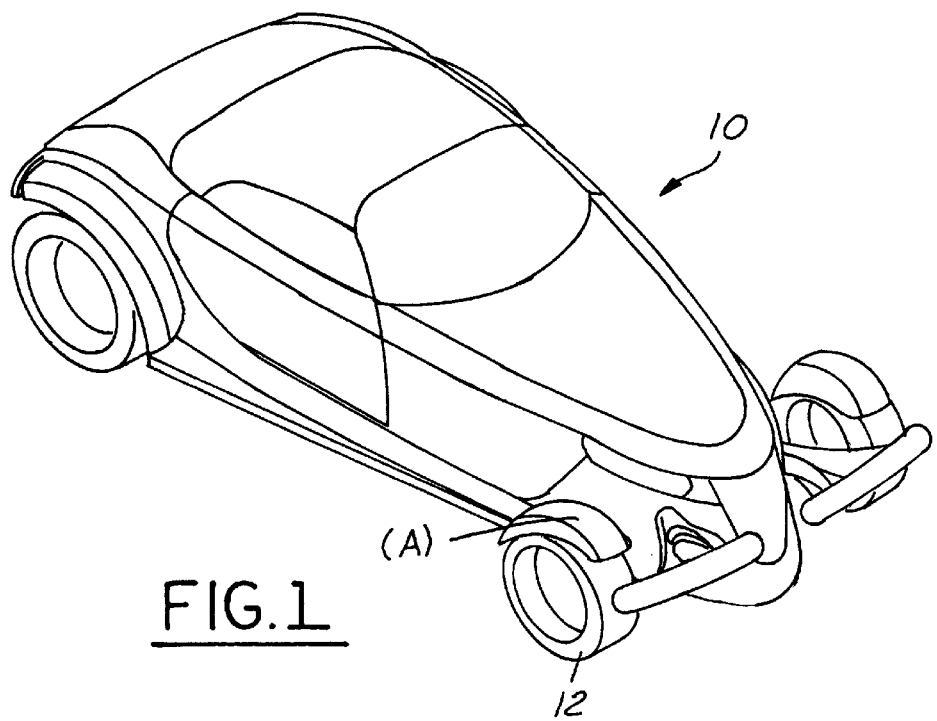
FIG. 1 is a perspective view of a motor vehicle in connection with which the universal slider bushing of this invention may be used.
Figure 2:
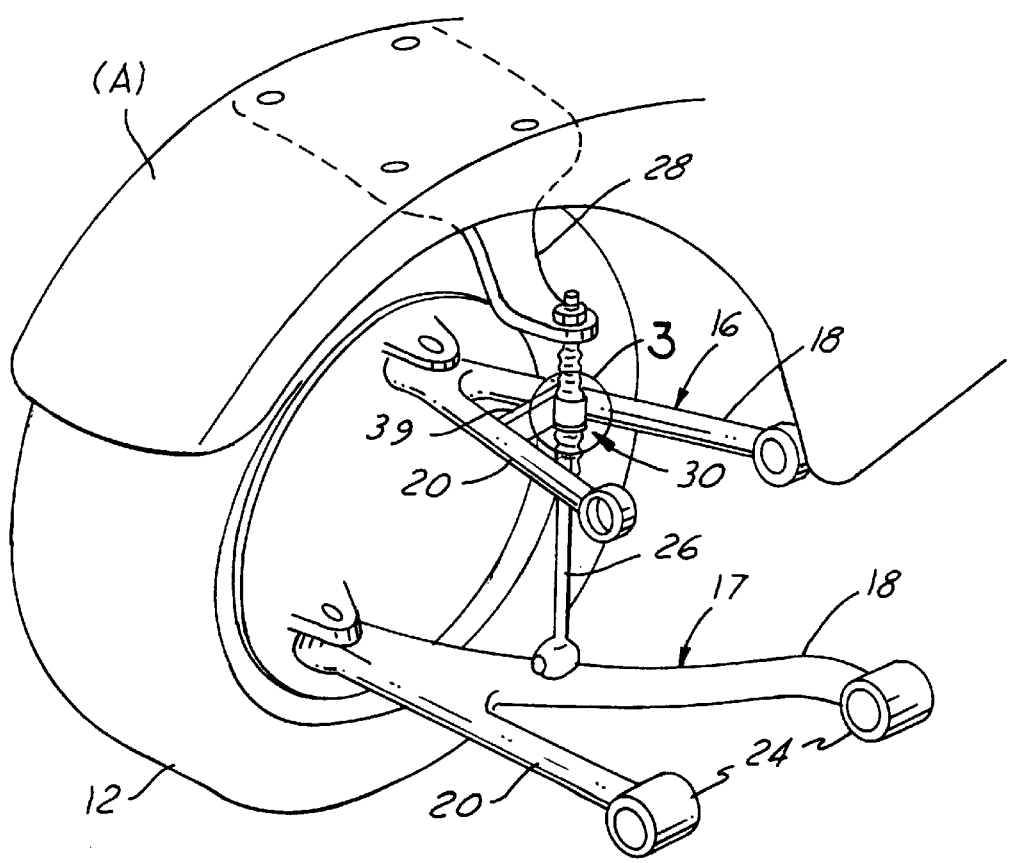
FIG. 2 is a fragmentary perspective view showing a wheel of the motor vehicle and also showing a universal slider bushing constructed in accordance with this invention and used in connection with the suspension for the wheel.

Referring now more particularly to the drawings, there is shown a motor vehicle 10 having a wheel 12 and a suspension for the wheel including control arms 16 and 17. The control arms are generally V-shaped, each having arm portions 18 and 20 formed with knuckles 24 adapted to be pivoted to the vehicle frame. A generally vertical shaft 26 has an upper end connected to a bracket 28 secured to the front fender (A) of the vehicle, and a lower end connected to the lower control arm. The shaft 26 extends through and is part of a universal slider bushing 30 constructed according to this invention.

Figure 3:
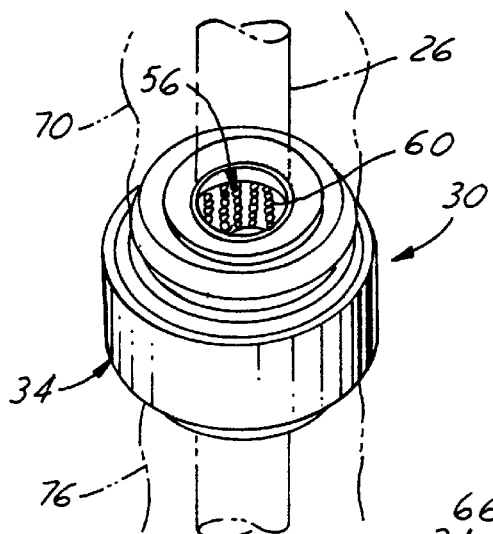
FIG. 3 is a fragmentary perspective view of the universal slider bushing shown within the circle 3 in FIG. 2.
Figure 4:
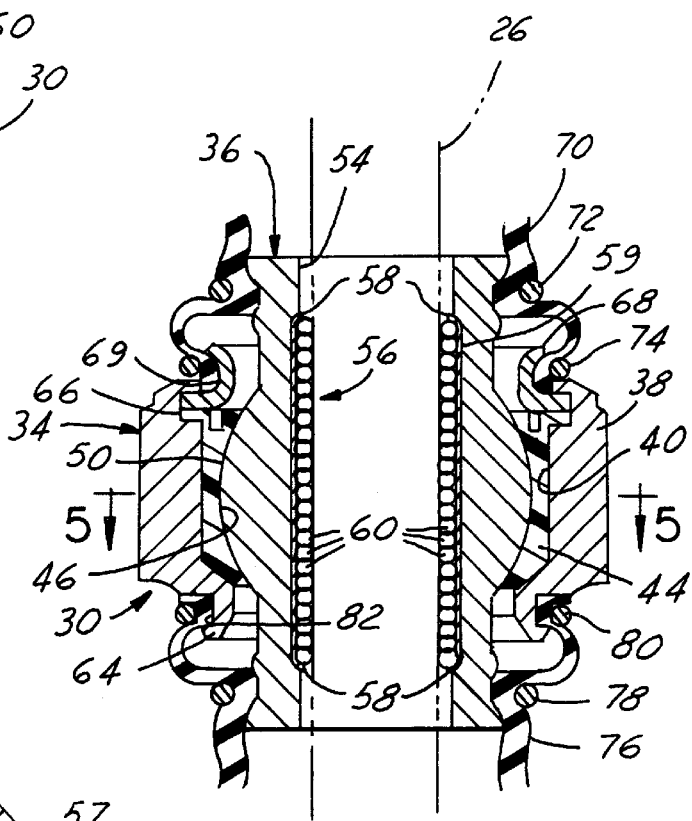
FIG. 4 is a longitudinal sectional view of the universal slider bushing.
Figure 5:
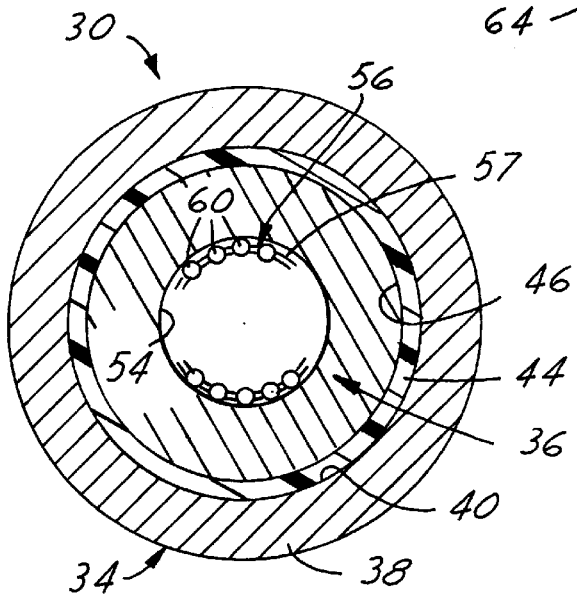
FIG. 5 is a sectional view taken on the line 5—5 in FIG. 4, with the shaft through the bushing removed for clarity.

The bushing 30 of this invention is best shown in FIGS. 3–5. As there shown, the bushing 30 includes an annular outer body or cage 34 and an inner body 36 within the outer body. The outer body 34 includes a ring-shaped metal shell 38 of steel, for example, which is rigidly secured to a bar 39 of the control arm 16. The shell 38 has a cylindrical radially inner surface 40 of uniform circular cross-section throughout its length. A ring 44 of plastic is bonded to the inner surface 40 of the shell in concentric relation therewith. The radially inner surface of the plastic ring 44 is of concave spherical shape. The ring 44 thus provides a spherical segment or socket 46 which is open at both upper and lower ends to accommodate the inner body 36 which extends through the outer body 34.

The inner body 36 is somewhat elongated with ends that extend beyond the ends of the shell 38 of the outer body 34 as shown in FIG. 4. The inner body has an integral convex spherical segment 50 midway between its ends. The segment 50 is of the same diameter as the socket or segment 46 and fits therein for universal movement.

The inner body 36 has an open-ended cylindrical central through-passage 54 which extends lengthwise through the inner body. The passage 54 is of uniform circular cross section throughout its length and supports a cylindrical ball bearing 56 therein. The ball bearing 56 includes a cylindrical ball retainer 57 having openings for receiving and retaining a multiplicity of balls 60. End flanges 58 of a retainer cage 59 confine the balls axially. The shaft 26 extends lengthwise through the passage 54 and is supported by the balls 60. The balls enable the shaft to slide lengthwise in the passage 54 and to rotate in the passage on its own central axis.

The outer body 34 has an integral annular flange 64 at its lower end. The inner diameter of the flange 64 is less than the diameter of the spherical segment 50 of the inner body 36. The outer body 34 at its upper end has an inside diameter greater than the diameter of the spherical segment 50. The inner wall of the outer body also has just beneath its upper end an annular recess or groove 66. An annular flange 68 of generally U-shaped cross-section has the lower end fitting in the groove 66 and extends upwardly from the lower end in a radially outwardly opening arc to form a recess 69 between the flange 68 and the upper end of the outer body. The flange 68 is a split ring and hence removable.

The outer body 34, including the shell 38 and plastic ring 44, may be formed of two separable, releasably interconnected, semi-cylindrical halves to facilitate assembly around the inner body 36.

A flexible, tubular, cylindrical boot 70 is provided to seal the space between the upper end of the outer body 34 and the upper end of the inner body 36. A snap ring 72 encircles the boot 70 and secures the upper end portion of the boot around the upper end of the inner body. A second snap ring 74 cooperates with the flange 68 in securing the lower end of the boot in the recess 69.

A similar tubular boot 76 of flexible material is provided to seal the space between the lower ends of the outer and inner bodies 34 and 36. A snap ring 78 secures the lower end portion of the boot 76 around the lower end of the inner body. A second snap ring 80 secures the upper end portion of the boot in an annular recess 82 in the outer body which faces radially outwardly and is located just above the lower end of the flange 64.

It will be apparent that the shaft 26 is capable of rotating and sliding lengthwise within the passage 54 in the inner body. Also, since the convex spherical segment 50 of the inner body 36 and the concave spherical segment 46 of the outer body 34 form a universal joint, the shaft 26 is also capable of universal movement.

What is claimed is:

1. A universal slider bushing comprising an annular outer body, an inner body disposed within said outer body, said inner body having a convex spherical segment, said outer body having a concave spherical segment receiving said convex spherical segment to support said inner body for universal movement relative to said outer body, said inner body having an elongated central through-passage, an elongated shaft having a central longitudinal axis and extending lengthwise within said passage, and a ball bearing supporting said shaft in said passage for longitudinal sliding movement and for rotation about the longitudinal axis thereof, wherein said inner body has first and second ends and said convex spherical segment is midway between said first and second ends, said outer body comprises a ring-shaped metal shell having first and second ends and an inner cylindrical surface, said concave spherical segment is made of plastic and is secured to the inner cylindrical surface of said shell, said shell has an integral annular flange at the first end thereof of lesser diameter than said convex spherical segment, said shell has an inner diameter at the second end thereof which is greater than said convex spherical segment, a removable annular flange at the second end of said shell of lesser diameter than said convex spherical segment, said convex spherical segment being captured between said flanges, said first and second ends of said inner body extending outwardly beyond said respective first and second ends of said shell, a first tubular boot providing a seal between said first end of said inner body and said first end of said shell, and a second tubular boot providing a seal between said second end of said inner body and said second end of said shell.

2. A universal slider bushing comprising an annular outer body, an inner body disposed within said outer body, said inner body having a convex spherical segment, said outer body having a concave spherical segment receiving said convex spherical segment to support said inner body for universal movement relative to said outer body, said inner body having an elongated central through-passage, an elongated shaft having a central longitudinal axis and extending lengthwise within said passage, a ball bearing supporting said shaft in said passage for longitudinal sliding movement and for rotation about the longitudinal axis thereof, said outer body comprising a ring-shaped shell having first and second ends, said shell having an integral annular flange at the first end thereof of lesser diameter than said convex spherical segment, said shell having an inner diameter at the second end thereof which is greater than said convex spherical segment, and a removable annular flange at the second end of said shell of lesser diameter than said convex spherical segment, said convex spherical segment being captured between said flanges.

* * * * *